(12) United States Patent
Chen

(10) Patent No.: US 11,531,443 B2
(45) Date of Patent: Dec. 20, 2022

(54) METHOD, APPARATUS, AND STORAGE MEDIUM FOR DETERMINING RELATIVE POSITION RELATIONSHIP OF CLICK EVENT

(71) Applicant: TENCENT TECHNOLOGY (SHENZHEN) COMPANY LIMITED, Shenzhen (CN)

(72) Inventor: Zhi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/183,818

(22) Filed: Feb. 24, 2021

(65) Prior Publication Data

US 2021/0181899 A1    Jun. 17, 2021

Related U.S. Application Data

(63) Continuation of application No. PCT/CN2019/117450, filed on Nov. 12, 2019.

(30) Foreign Application Priority Data

Dec. 4, 2018   (CN) .......................... 201811471442.9

(51) Int. Cl.
*G06F 3/0481*   (2022.01)
*G06F 9/451*    (2018.01)
(Continued)

(52) U.S. Cl.
CPC .......... *G06F 3/0481* (2013.01); *G06F 3/0484* (2013.01); *G06F 9/451* (2018.02); *G06K 9/6215* (2013.01); *G06V 10/56* (2022.01)

(58) Field of Classification Search
CPC ...... G06F 3/0481; G06F 3/0484; G06F 9/451; G06K 9/4652; G06K 9/6215
See application file for complete search history.

(56) References Cited

U.S. PATENT DOCUMENTS

| 2006/0095245 A1 | 5/2006 | Ruff et al. |
| 2008/0175433 A1 | 7/2008 | Deiotte et al. |

(Continued)

FOREIGN PATENT DOCUMENTS

| CN | 101593110 A | 12/2009 |
| CN | 101661171 A | 3/2010 |

(Continued)

OTHER PUBLICATIONS

Xiaoyao, Wuji, Irregular Region Responding to Client Event, Sep. 30, 2015, with English abstract from google translation, https://blog.csdn.net/yy471101598/article/details/48826807.

(Continued)

*Primary Examiner* — Tan H Tran
(74) *Attorney, Agent, or Firm* — Crowell & Moring LLP

(57) ABSTRACT

The present disclosure describes a method, a device, and medium for determining a relative position relationship of a click event. The method includes receiving, by a device, a click event in an interface view, the interface view comprising an image region configured to respond to the click event. The method also includes determining, by the device, a click position of the click event in the interface view; obtaining, by the device, color information of a pixel corresponding to the click position based on the click position of the click event in the interface view; determining, by the device according to the color information of the pixel corresponding to the click position, a relative position relationship (Continued)

between the click position and the image region; and processing, by the device, the click event based on the relative position relationship.

17 Claims, 14 Drawing Sheets

(51) Int. Cl.
  *G06F 3/0484* (2022.01)
  *G06K 9/62* (2022.01)
  *G06V 10/56* (2022.01)

(56) References Cited

U.S. PATENT DOCUMENTS

| | | | |
|---|---|---|---|
| 2013/0019182 A1* | 1/2013 | Gil | G06F 3/0482 715/738 |
| 2015/0109323 A1* | 4/2015 | Johnson | G06T 11/60 345/594 |
| 2017/0075544 A1* | 3/2017 | Price | G06T 7/11 |
| 2017/0236001 A1* | 8/2017 | McLean | G06F 3/0304 345/620 |
| 2019/0147279 A1* | 5/2019 | Liu | G06V 20/46 382/181 |
| 2021/0209153 A1* | 7/2021 | Zhang | G06K 9/00288 |

FOREIGN PATENT DOCUMENTS

| | | |
|---|---|---|
| CN | 102855132 A | 1/2013 |
| CN | 103543923 A | 1/2014 |
| CN | 103577322 A | 2/2014 |
| CN | 104978739 A | 10/2015 |
| CN | 106843633 A | 6/2017 |
| CN | 106951138 A | 7/2017 |
| CN | 107784301 A | 3/2018 |
| CN | 108319898 A | 7/2018 |
| KR | 100835212 B1 | 6/2008 |

OTHER PUBLICATIONS

International Search Report with English translation and Written Opinion for corresponding PCT/CN2019/117450 dated Jan. 23, 2020.
Chinese Office Action with concise English explanation regarding 201811471442.9 dated May 8, 2021, 9 pgs.
Xiaoyao-Wuji, "Irregular areas respond to click events," with Abstract, Sep. 30, 2015, 10 pgs.
Chinese Office Action with concise English explanation regarding 201811471442.9 dated Dec. 3, 2021, 11 pages.
Xiao pupu, "Recognition of Irregular graphics click events is better," with English summary by google translation, May 21, 2016, 13 pgs.

* cited by examiner

METHOD, APPARATUS, AND STORAGE MEDIUM FOR DETERMINING RELATIVE POSITION RELATIONSHIP OF CLICK EVENT

RELATED APPLICATION

This application is a continuation application of PCT Patent Application No. PCT/CN2019/117450, filed on Nov. 12, 2019, which claims priority to Chinese Patent Application No. 201811471442.9, filed with the National Intellectual Property Administration, PRC on Dec. 4, 2018, both of which are incorporated herein by reference in their entireties.

FIELD OF THE TECHNOLOGY

This application relates to data processing technologies, and in particular, to a method, apparatus, and storage medium for processing information in a view.

BACKGROUND OF THE DISCLOSURE

An interface view of an application program includes an image view. An image region displayed in the image view may be an irregular region. That is, an image displayed in the image view has an irregular shape. There are problems/issues associated with how to determine whether a click event occurs in the irregular region, for example but not limited to, low efficiency, and/or poor accuracy.

The present disclosure describes various embodiments for determining a relative position relationship of a click event in an image view, addressing at least some of the problems/issues discussed above, and improving accuracy and providing a better user experience.

SUMMARY

Embodiments of this application provide a method, an apparatus, and storage medium for determining a relative position relationship of a click event in a view, to improve the accuracy of processing a click event in an image view.

The present disclosure describes a method for determining a relative position relationship of a click event. The method includes receiving, by a device, a click event in an interface view, the interface view comprising an image region configured to respond to the click event. The device includes a memory storing instructions and a processor in communication with the memory. The method also includes determining, by the device, a click position of the click event in the interface view; obtaining, by the device, color information of a pixel corresponding to the click position based on the click position of the click event in the interface view; determining, by the device according to the color information of the pixel corresponding to the click position, a relative position relationship between the click position and the image region; and processing, by the device, the click event based on the relative position relationship.

The present disclosure describes an apparatus for determining a relative position relationship of a click event. The apparatus includes a memory storing instructions; and a processor in communication with the memory. When the processor executes the instructions, the processor is configured to cause the apparatus to: receive a click event in an interface view, the interface view comprising an image region configured to respond to the click event, determine a click position of the click event in the interface view, obtain color information of a pixel corresponding to the click position based on the click position of the click event in the interface view, determine, according to the color information of the pixel corresponding to the click position, a relative position relationship between the click position and the image region, and process the click event based on the relative position relationship.

The present disclosure describes a non-transitory computer readable storage medium, storing computer readable instructions. The computer readable instructions, when executed by a processor, are configured to cause the processor to perform: receiving a click event in an interface view, the interface view comprising an image region configured to respond to the click event; determining a click position of the click event in the interface view; obtaining color information of a pixel corresponding to the click position based on the click position of the click event in the interface view; determining, according to the color information of the pixel corresponding to the click position, a relative position relationship between the click position and the image region; and processing the click event based on the relative position relationship.

An embodiment of this application provides a method for processing information in a view, performed by an electronic device, including:

receiving a click event for an interface view, the interface view including an image region for responding to the click event;

determining a click position of the click event in the interface view;

obtaining color information of a pixel corresponding to the click position based on the click position;

determining a relative position relationship between the click position and the image region according to the obtained color information of the pixel; and processing the click event based on the determined relative position relationship.

An embodiment of this application provides an apparatus for processing information in a view, including:

a receiving unit, configured to receive a click event for an interface view, the interface view including an image region for responding to the click event;

a positioning unit, configured to determine a click position of the click event in the interface view;

an obtaining unit, configured to obtain color information of a pixel corresponding to the click position based on the click position;

a determination unit, configured to determine a relative position relationship between the click position and the image region according to the obtained color information of the pixel; and a processing unit, configured to process the click event based on the determined relative position relationship.

An embodiment of this application provides an apparatus for processing information in a view, including:

a memory, configured to store executable instructions; and a processor, configured to implement the method for processing information in a view provided in the embodiments of this application when executing the executable instructions stored in the memory.

An embodiment of this application provides a storage medium, storing executable instructions used for enabling a memory to perform the method for processing information in a view provided in the embodiments of this application.

DESCRIPTION OF EMBODIMENTS

Figure 1:
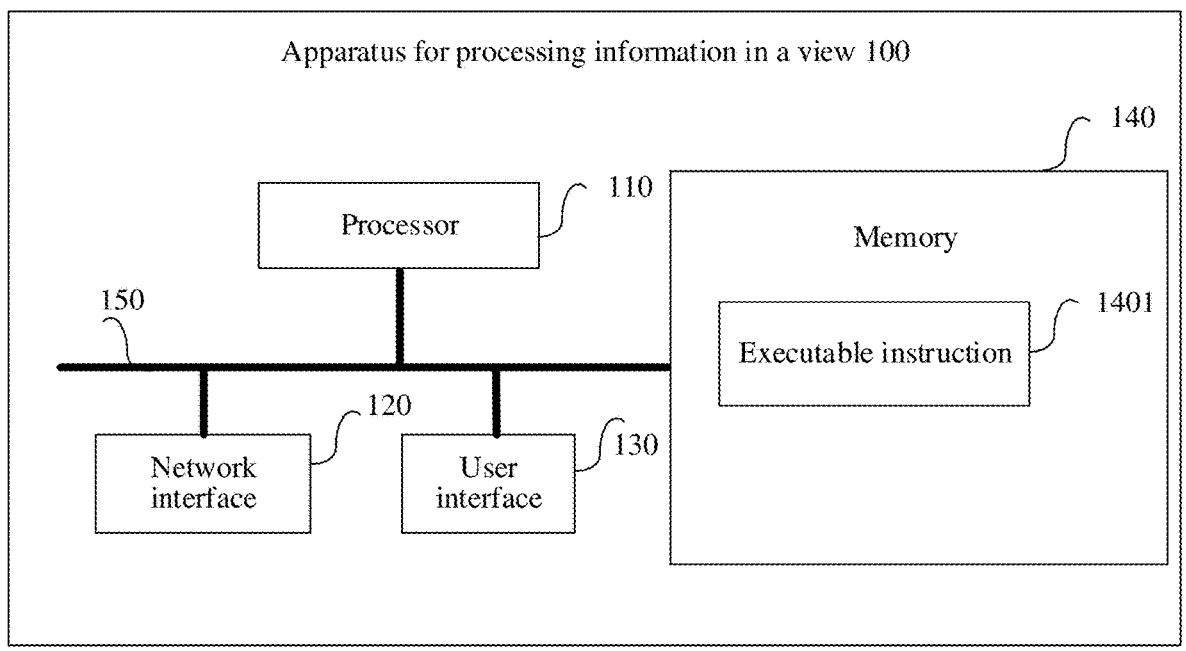
FIG. 1 is a schematic structural diagram of an apparatus for processing information in a view according to an embodiment of this application.

To make the objectives, technical solutions, and advantages of this application clearer, the following further describes this application in detail with reference to the accompanying drawings. The described embodiments are a part rather than all the embodiments of this application. All other embodiments obtained by a person of ordinary skill in the art according to the embodiments of this application without creative efforts shall fall within the protection scope of this application.

In the embodiments of this application, the terms "comprise", "include", and any variants thereof are intended to cover a non-exclusive inclusion. Therefore, a method or an apparatus that includes a series of elements not only includes such elements provided clearly, but also includes other elements not listed expressly, or may include inherent elements for implementing the method or apparatus. Without more limitations, an element limited by "include a/an . . . " does not exclude other related elements (for example, steps in the method, or units in the apparatus, the units herein may be some circuits, some processors, some programs or software, and the like) existing in the method or the device that includes the element.

For example, the method provided in the embodiments of this application includes a series of steps, but the method provided in the embodiments of this application is not limited to the provided steps. Similarly, the apparatus provided in the embodiments of this application includes a series of units, but the apparatus provided in the embodiments of this application is not limited to the clearly provided units, and may further include a unit that needs to be set to obtain related information or perform processing based on information.

When an image displayed in an image view has an irregular shape and the image view receives a click event from a user, to conveniently determine whether the click event occurs in an irregular region, the irregular region is usually approximated as a regular region, and the determination and corresponding processing are then performed. However, this processing manner requires complex operations and is not accurate enough.

The present disclosure describes various embodiments for providing a method and an apparatus for processing information in a view and a storage medium, improving the accuracy of processing a click event in an image view. In the embodiments of this application, a relative position relationship between a click position and an image region is determined based on color information of a pixel corresponding to the click position, and it is not necessary to make any adjustment or change to the shape of the image region, so that the relative position relationship between the click position and the image region can be accurately determined. Compared with the manner of approximating the irregular region as the regular region, this application is simpler to implement and has higher applicability.

First, the apparatus for implementing the embodiments of this application is described. The apparatus for processing information in a view provided in the embodiments of this application may be implemented in a manner of hardware, software, or a combination of hardware and software. The following describes various exemplary implementations of the apparatus for processing information in a view provided in the embodiments of this application.

A hardware structure of the apparatus for processing information in a view provided in the embodiments of this application is described in detail. FIG. 1 is a schematic structural diagram of the hardware of an apparatus 100 for processing information in a view according to an embodiment of this application. The apparatus for processing information in a view may be an electronic device with a data processing capability and a display apparatus. It may be understood that FIG. 1 only shows the exemplary structure of the apparatus for processing information in a view rather than the entire structure. A part of the structure or the entire structure shown in FIG. 1 may be implemented as required. In this embodiment of this application, the apparatus 100 for processing information in a view includes at least one processor 110, a memory 140, at least one network interface 120, and a user interface 130. Various components in the apparatus for processing information in a view are coupled together by a bus system 150. It may be understood that the bus system 150 is configured to implement connection and communication between the components. In addition to a data bus, the bus system 150 further includes a power bus, a control bus, and a status signal bus. However, for ease of clear description, all types of buses are marked as the bus system 150 in FIG. 1.

The user interface 130 may include a display, a keyboard, a mouse, a trackball, a click wheel, a key, a button, a touchpad, or a touch screen.

The memory 140 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), a flash memory, and the like. The volatile memory may be a random access memory (RAM), used as an external cache. According to exemplary but not limited descriptions, many forms of RAMs are available, for example, a static random access memory (SRAM), a synchronous static random access memory (SSRAM), and the like. The memory 140 described in this embodiment of this application aims to include these memories and any other suitable type of memories.

The processor 110 may be an integrated circuit chip having a signal processing capability, for example, a general purpose processor, a DSP, or another PLD, discrete gate, transistor logical device, or discrete hardware component. The general purpose processor may be a microprocessor, any conventional processor, or the like.

The memory 140 can store executable instructions 1401 to support operations of the apparatus 100 for processing information in a view. These examples of the executable instructions include: a program for operating on the apparatus 100 for processing information in a view; a software module with various forms such as a plug-in and a script; and a program may include an operating system and an application program, the operating system including various system programs such as a framework layer, a kernel library layer, and a driver layer, which are configured to implement various basic services and process hardware-based tasks.

Before a method for processing information in a view provided in an embodiment of this application is described, an interface view in this embodiment of this application is first described. An interface view is instantiation of an interface view class (a process of creating an object with a class is referred to as instantiation), which defines a display region (for example, a rectangular region) on a screen, processes a touch event in the display region, and can display/update content based on the touch event.

The display of the application program is implemented through a UIKit, and the UIKit is obtained by encapsulating a graph library such as an open graph library (OpenGL). The structure of the UIKit is then described with reference to FIG. 2.

Figure 2:
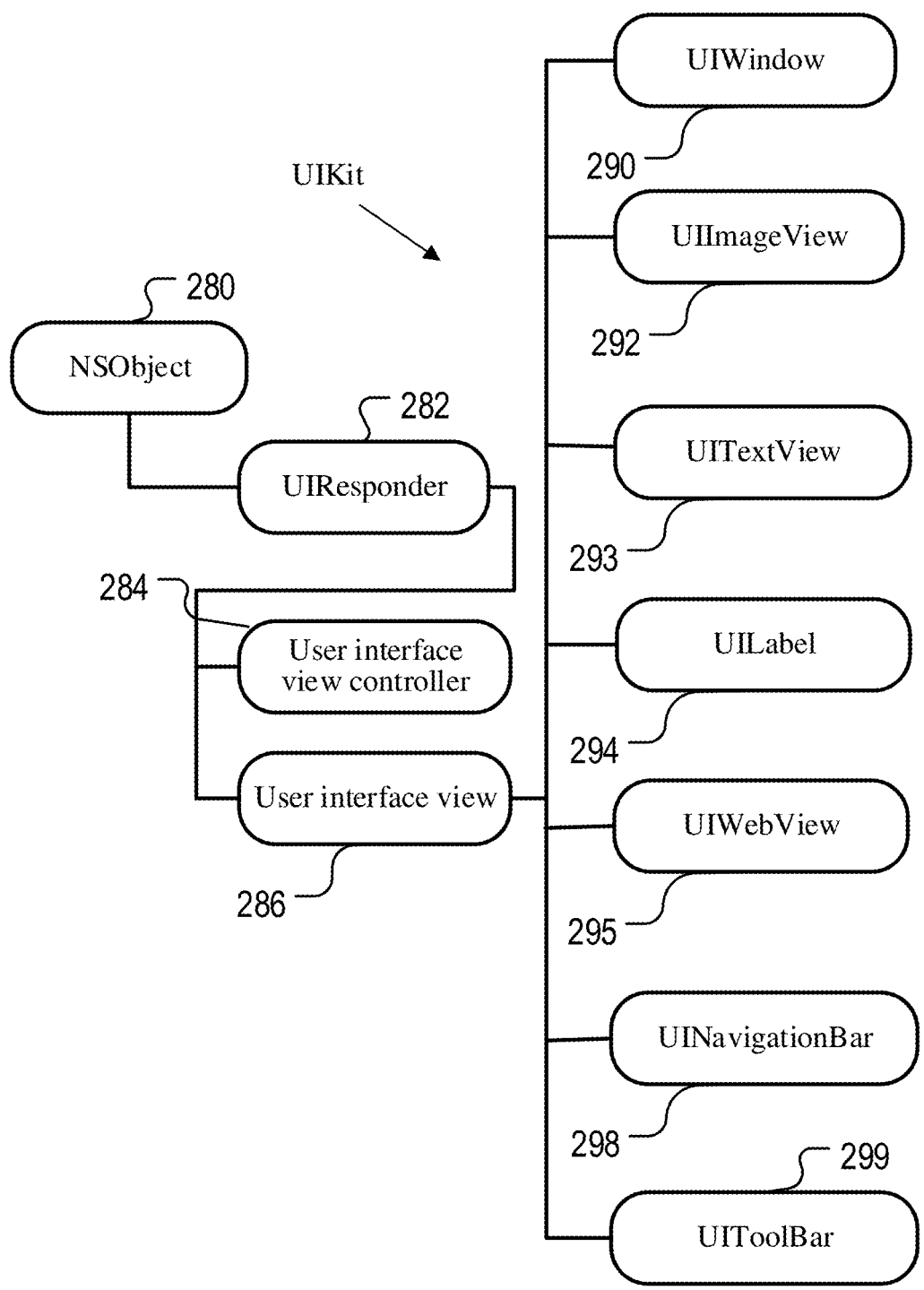
FIG. 2 is a schematic structural diagram of a user interface kit (UIKit) according to an embodiment of this application.

FIG. 2 is a schematic structural diagram of the UIKit according to an embodiment of this application. A root object (NSObject 280) is instantiation of a root class of an application program code structure (the NSObject is not inherited from any class in the application program). An order based on an inheritance relationship of the NSObject is: the NSObject, a user interface responder (UIResponder 282), a user interface view controller 284, and a child view that is inherited from the interface view 286. It may be understood that, during actual application, the interface view may be an image view, a scroll view, and a tab bar view, and the like. The image view (UIImageView 292) is inherited as a visual control from the interface view (UIView), and is used for displaying various formats of images. Each view is placed on a parent view of the view and manages child views of the view. If two sibling child views overlap, the view added later (or the view arranged behind a child view array) appears on the top layer of the other view.

The child views included in the interface view as the parent view are then exemplarily described according to FIG. 2. The UIKit shown in FIG. 2 is only an example. According to different versions of the UIKit and devices/operating systems applicable to the UIKit, the inheritance relationship and the views shown in FIG. 2 have differences that may be easily implemented. Therefore, FIG. 2 is not to be considered as a limitation to the UIKit applicable to the embodiments of this application.

1) Window

The window is a user interface window (UIWindow 290) object. An application program only has one UIWindow object that is a root container of all views and is used as a container to provide a region to display the interface view and may cooperate with an interface view controller (UIViewController) to implement support for the rotation of display directions.

2) Views of Displaying Information

The views include: an image view, used for displaying various formats of images; a text view (UITextView 293), used for displaying a text; a label view (UILabel 294), used for displaying various labels; a web view (UIWebView 295), used for displaying web page content; and a scroll view (UIScrollView), used for displaying content in a scrolling manner.

3) Various Bars

The bars include: a user interface navigation bar (UINavigationBar 298), used for providing page operations such as "Next" and "Back"; a user interface tab bar (UITabBar), used for displaying tabs with various functions; a user interface search bar (UISearchBar), used for providing search operations; and a user interface tool bar (UIToolBar 299), used for providing various tools on the user interface.

Here, the functions of the interface view and the child views thereof have been described. The interface view is a basic element that forms a screen display, has a position attribute and a rectangle with a particular size, usually has a background color, and is not movable. The interface view may also include content such as a character string or a picture. For example, the UILabel is a UIKit including a character string, and the UIImageView is an interface view including a picture.

Figure 3:
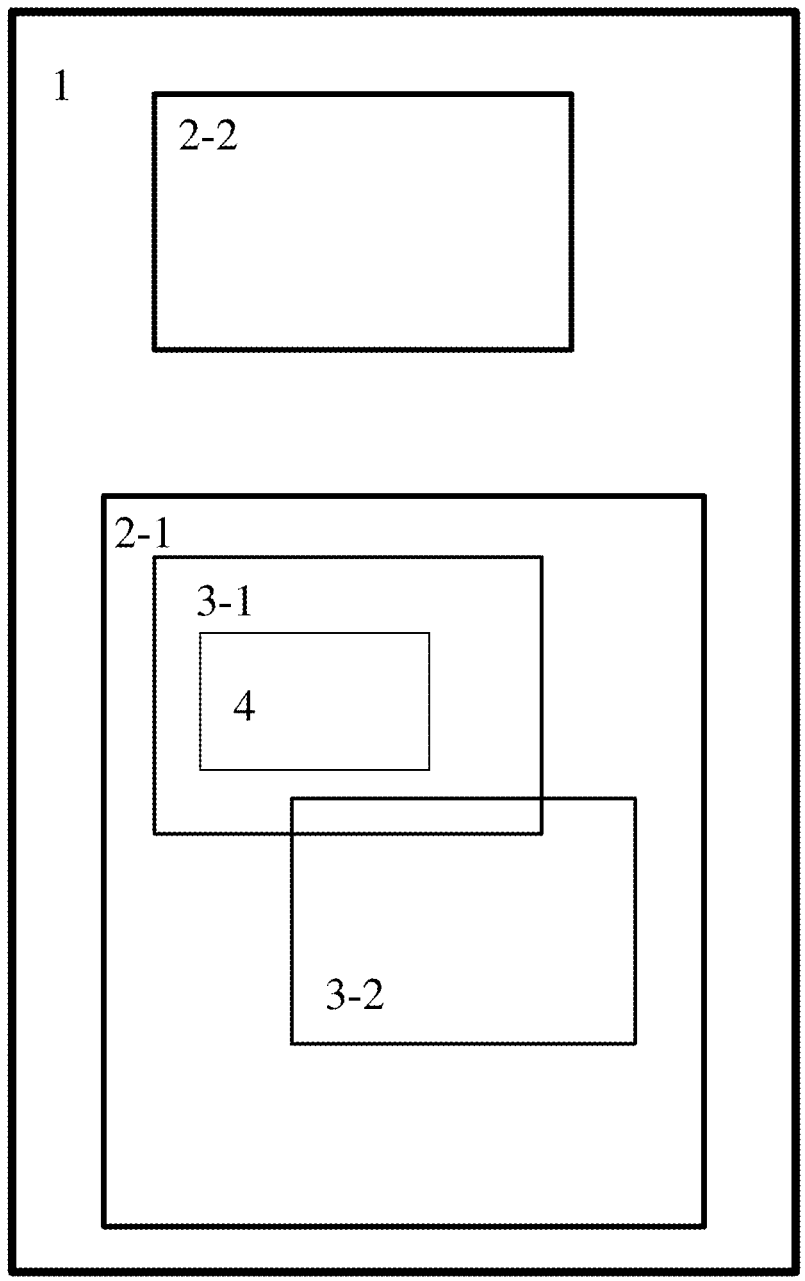
FIG. 3 is a schematic diagram of transferring a click event in an interface view according to an embodiment of this application.

The processing of a click event that occurs in an interface view is then described. FIG. 3 is a schematic diagram of transferring a click event in an interface view according to an embodiment of this application. Referring to FIG. 3, a rectangular region numbered 1 is an interface view 1 (root view) as a visual parent control, rectangular regions numbered 2 to 4 are child views that are inherited from the view 1 (views 2-1, 2-2, 3-1, and 3-2 are exemplarily shown in the figure). The view 3-1 is a child view of the view 2-1, and a view 4 is the child view of the view 3-1. When a user implements a click operation, for example, the user clicks a region shown in the view 4, an application program transfers the click event to a window, and the window determines whether the click event occurs in the window. If it is determined that the click event occurs in the window, that is, the window can receive the click event, to find the most suitable view, the window may traverse child controls of the window from back to front, and a view that is added later is placed on the top. First, the window transfers the click event to the root view 1. The view 1 determines, according to a determination logic of the view, whether the view needs to respond to the click event. Each layer of view has a corresponding determination logic. That is, the determination logics of the layers of view are independent of each other. As shown in FIG. 3, when the click event occurs in the region shown in the view 4, a transfer order of the click event is the view 1, the view 2-1, the view 3-1, and the view 4.

Figure 4:
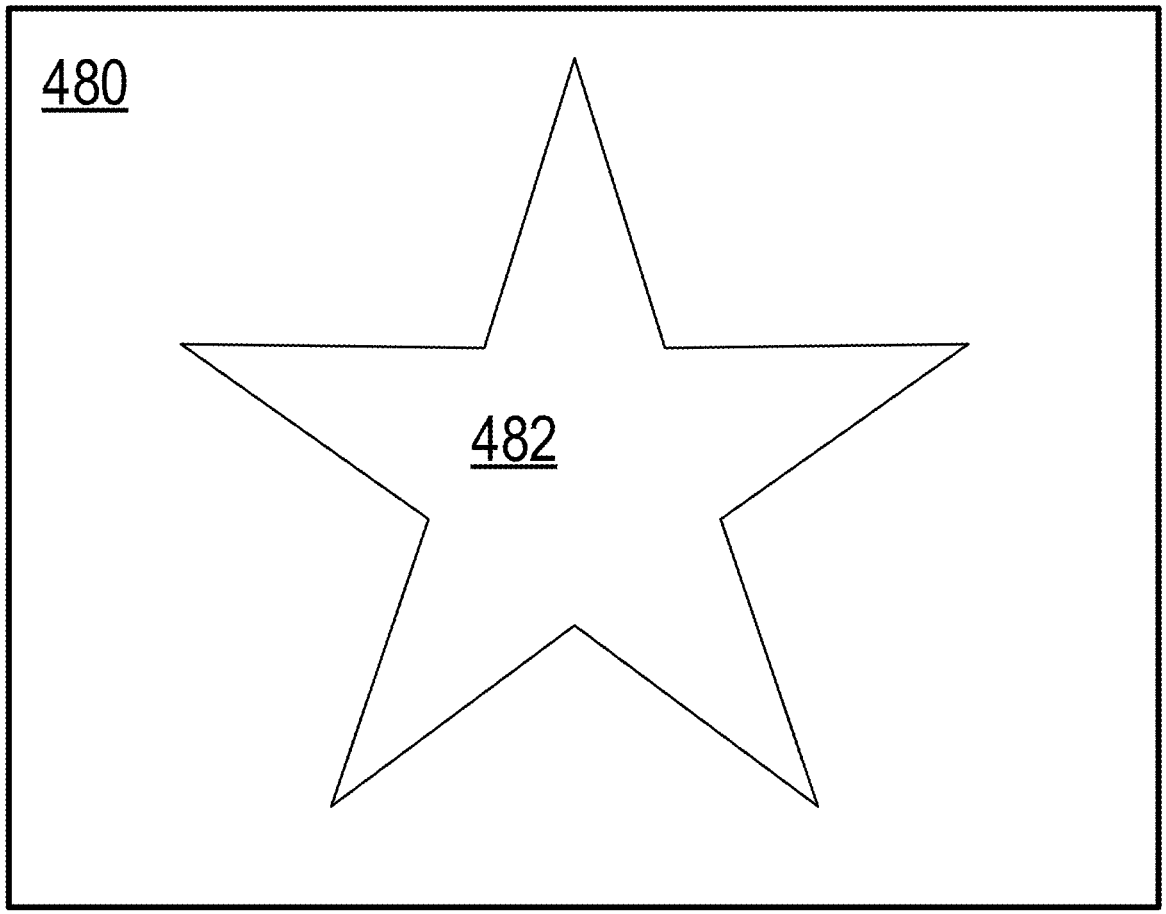
FIG. 4 is a schematic diagram of an irregular image region in an interface view according to an embodiment of this application.

The present disclosure describes various embodiments for a method for processing information in a view. For example, an image view may be understood as a tab. For the click event that occurs in the image view, in some application scenarios, the image view needs to support a clickable area comprising the irregular region. FIG. 4 is a schematic diagram of an irregular image region in an interface view according to an embodiment of this application. Referring to FIG. 4, the region (that is, the display region of the image view) is a rectangle 480. A picture of a pentagram 482 is displayed in the image view, and only the click event that occurs in the pentagram may be considered as a click on the tab.

Figure 5:
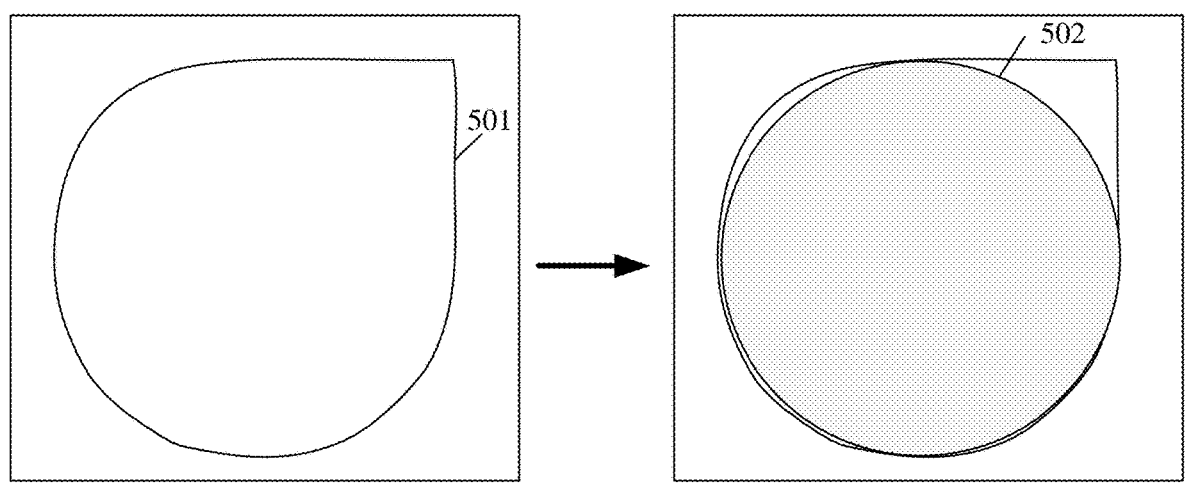
FIG. 5 is a schematic diagram of processing a click event in an image view according to an embodiment of this application.

In some embodiments, for an implementation of processing the click event in the interface view, reference may be made to FIG. 5. FIG. 5 is a schematic diagram of processing a click event in an image view according to an embodiment of this application. A picture displayed in the image view is an irregular region numbered 501. The image view responds to the click event only when the click event occurs in the irregular region 501. When the image view detects the click event from the user, the irregular region 501 is approximated as a regular circle 502, and it is then determined, according to position information of the click event, whether the click event occurs in the regular circle 502. That is, the determination of whether the click event occurs in the irregular region 501 is converted into the determination of whether the click event occurs in the regular circle region 502, to further process the click event. However, because a graph region on which the processing manner is based is not an original image region in the image view and cannot match the original graph outline, the accuracy of the determination is not high. In addition, when the user changes picture materials in the view and then receives the click event, it is necessary to regenerate a regular region. The generation of the regular region often requires more complex mathematical geometry and complex operations.

Figure 6:
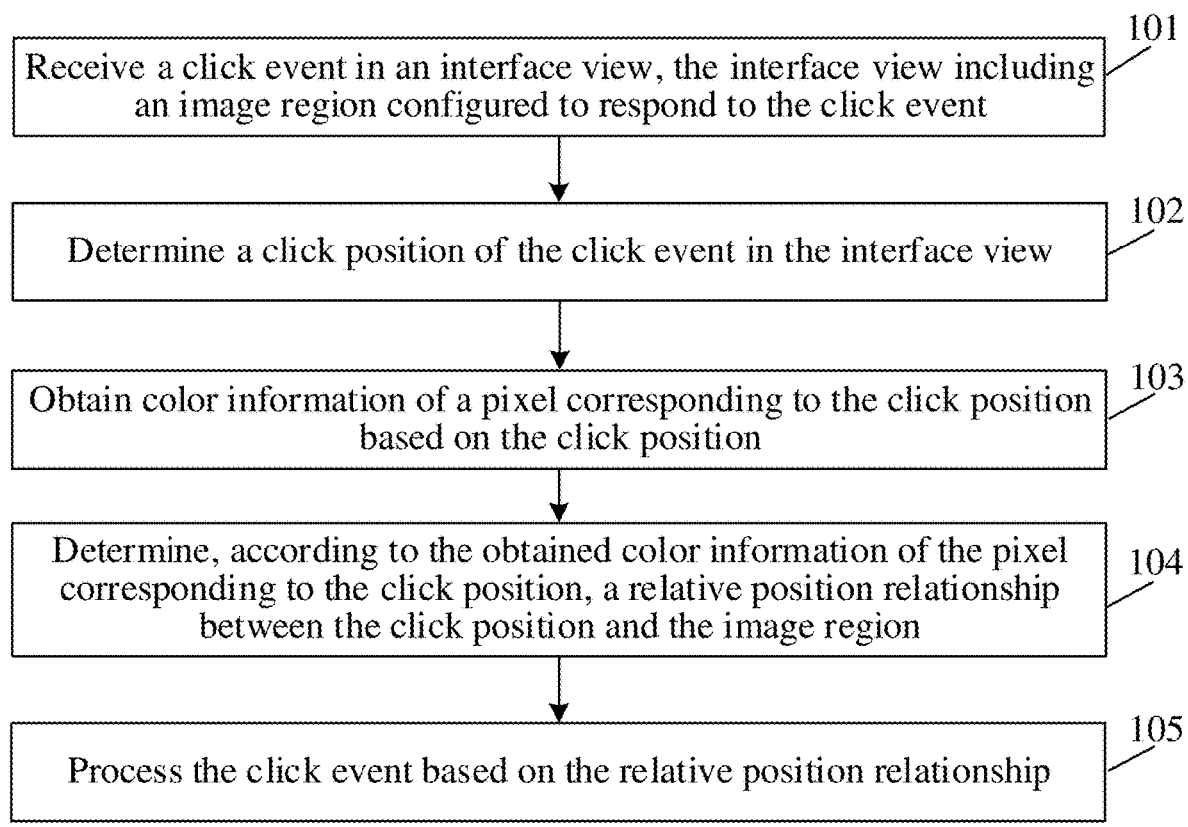
FIG. 6 is a schematic flowchart of a method for processing information in a view according to an embodiment of this application.

FIG. 6 is an exemplary schematic flowchart of a method for processing information in a view according to an embodiment of this application, including step 101 to step 105, which are described respectively below.

Step 101: Receive a click event in an interface view, the interface view including an image region configured to respond to the click event.

In this embodiment of this application, an example in which the interface view is used as a root view is used for description, but the interface view is not limited to a root view. For example, the interface view may also be a child view including the image region that can respond to the click event.

Figure 7:
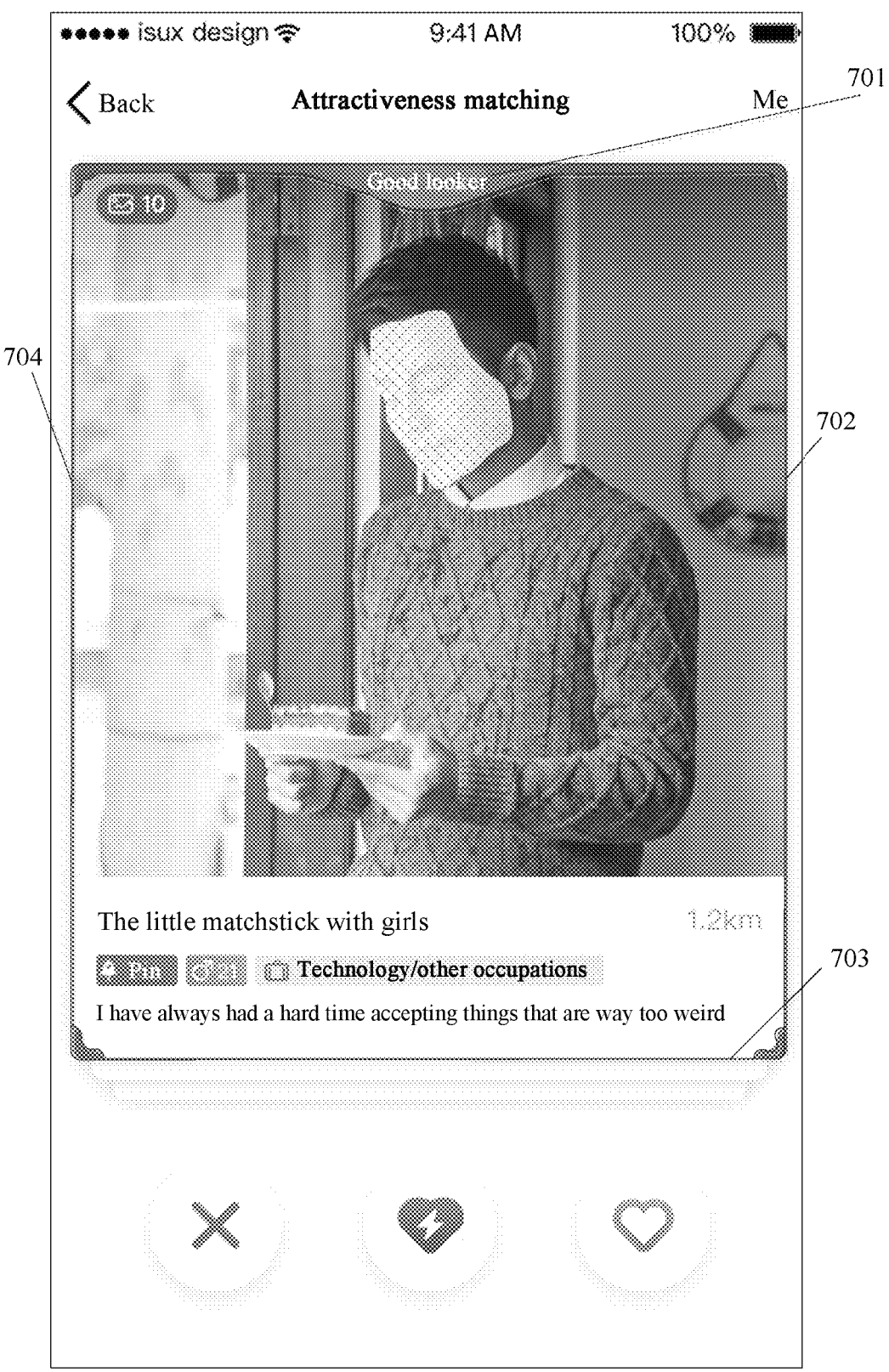
FIG. 7 is a schematic diagram of an interface view of live streaming according to an embodiment of this application.

For example, the application scenario is a live streaming application program. FIG. 7 is a schematic diagram of an interface view of live streaming according to an embodiment of this application. Referring to FIG. 7, a current interface view corresponds to an attractiveness matching page. The interface view includes a picture region for responding to the click event from the user, that is, the region formed by sides numbered 701 to 704 shown in FIG. 7, that is, the irregular region formed by four sides including a "good looker" region. When the user clicks the irregular region, the click event occurs in the irregular region, and a UIViewController responds to the click event to perform a page jump.

Step 102: Determine a click position of the click event in the interface view.

During actual implementation, when the user implements a click operation on the current interface view, the interface view detects the click event and determines the position of the click event in the interface view. For example, the size of the display region of the interface view on the screen is 320×480 pixels. When the user clicks a central position of the interface view, it is detected that the click position of the click event in the interface view is (160, 240).

Step 103: Obtain color information of a pixel corresponding to the click position based on the click position.

In an embodiment, the color information of the pixel corresponding to the click position may be obtained in the following manner:

Based on the click position of the click event in the interface view, the position of the click position relative to the image region for responding to the click event in the interface view is determined; according to the relative position, a pixel position corresponding to the relative position is determined; and the color information of the pixel corresponding to the pixel position is obtained.

The position of the click position relative to the image region for responding to the click event in the interface view may be determined in the following manner:

The image filling manner of the interface view is obtained; and the position of the click position relative to the image region is determined based on the image filling manner and the click position.

Herein, the image filling manner of the interface view is described.

The following descriptions of directionality, for example, "above", "below", "left", "right", "left portion", "right portion", "top", "bottom", "vertical", and "horizontal", are based on a front angle facing the screen of the electronic device as a reference.

In an embodiment, the image filling manner may be understood as the position and size of the image in the interface view. The size of the image in the interface view involves stretching of the image, and the position of the image in the interface view involves the layout of an image. The size of the image in the interface view is keeping the size of the image unchanged, stretching the image in the horizontal direction or stretching the image in the vertical direction. The position of the image in the interface view is one or more of the following relationships: the image is located at the left of the region displayed in the interface view, the image is located at the right of the region displayed in the interface view, the image is located at the top of the region displayed in the interface view, the image is located at the bottom of the region displayed in the interface view, and the image is displayed in the center of the interface view.

When the image is located at the left of the region displayed in the interface view, the image is located at the left of the region displayed in the interface view and is in contact with an edge of the region; when the image is located at the right of the region displayed in the interface view, the image is located at the right of the region displayed in the interface view and is in contact with an edge of the region; when the image is located at the top of the region displayed in the interface view, the image is located at the top of the region displayed in the interface view and is in contact with an edge of the region; when the image is located at the bottom of the region displayed in the interface view, the image is located at the bottom of the region displayed in the interface view and is in contact with an edge of the region; and when the image is displayed in the center of the interface view, the image may be or may not be in contact with an edge of the region displayed in the interface view.

Figure 8:
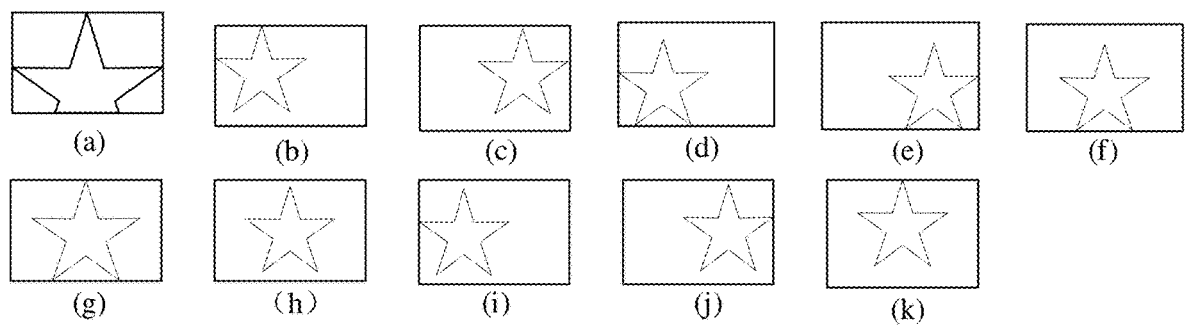
FIG. 8 is a schematic diagram of different image filling manners of an interface view according to an embodiment of this application.

FIG. 8 is a schematic diagram of different image filling manners of an interface view according to an embodiment of this application. As shown in FIG. 8(a), the size of the picture (pentagram) in the horizontal direction is the same as the size of the region displayed in the interface view in the horizontal direction. That is, the picture is stretched in the horizontal direction. In addition, the picture is located at the top of the region displayed in the interface view. As shown in FIG. 8(b), the size of the picture (pentagram) is kept unchanged, and the picture is displayed at the left and top of the region displayed in the interface view. Still, as shown in FIG. 8(h), the size of the picture (pentagram) is kept unchanged, and the picture is displayed in the center of the region displayed in the interface view and is not in contact with the edge of the region displayed in the interface view. The other image filling manners shown in FIG. 8 are not described herein one by one.

Figure 9:
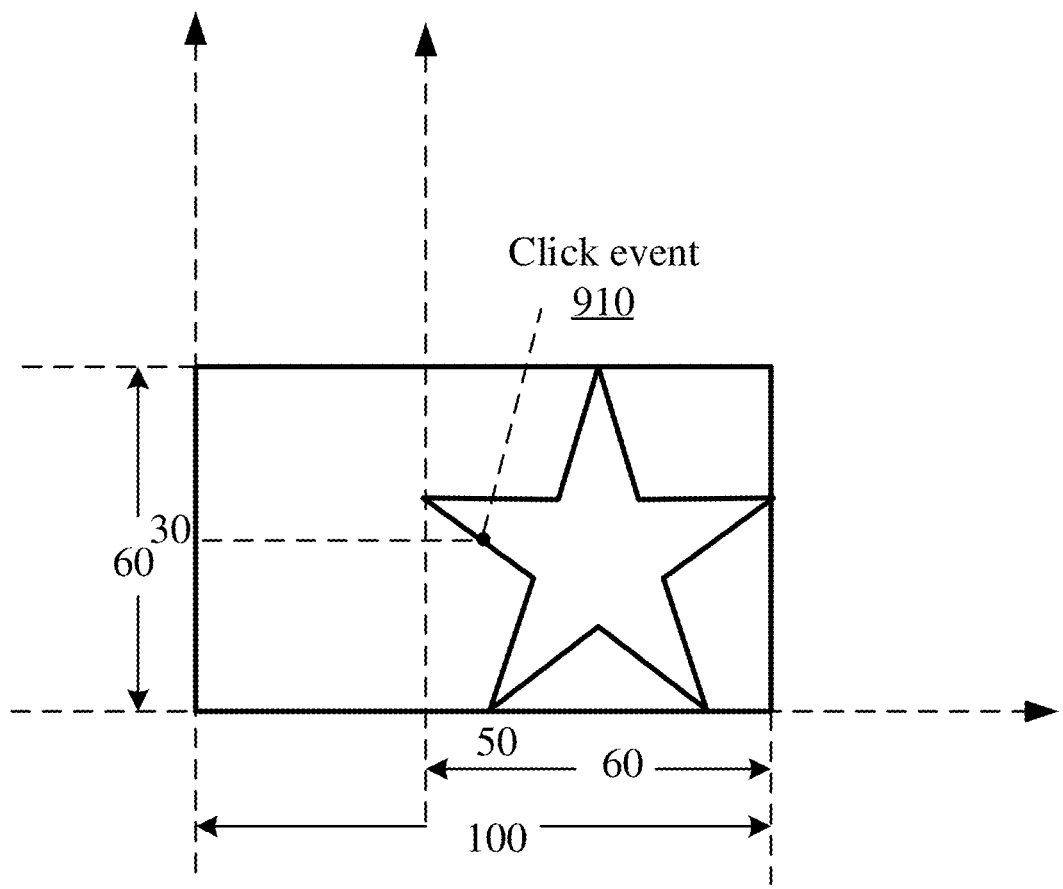
FIG. 9 is a schematic diagram of determining a position of a click position relative to an image region according to an embodiment of this application.

The filling manner (referred to as a filling manner 1) in FIG. 8(g) and the filling manner (referred to as a filling manner 2) in FIG. 9 are used as an example for description. For the filling manner 1, the size of the picture (pentagram) in the vertical direction is the same as the size of the region displayed in the interface view in the vertical direction, and the picture is displayed in the center of the interface view. For the filling manner 2, the size of the picture (pentagram) in the vertical direction is the same as the size of the region displayed in the interface view in the vertical direction, and the picture is displayed at the right in the interface view.

Based on the foregoing description of the image filling manner of the interface view, the filling manner 2 in FIG. 9 is used as an example to describe the process of determining the position of the click position relative to the image region for responding to the click event 910 in the interface view. In an embodiment, according to the image filling manner, a coordinate position of the click position on the screen of the electronic device may be converted into a coordinate position of the click position relative to the image region for responding to the click event in the interface view. FIG. 9 is a schematic diagram of determining a position of a click position relative to an image region according to an embodiment of this application. Assuming that the size of the display region of the interface view on the screen is 100×60 pixels, when the user clicks a central position of the view, it is detected that the click position of the click event in the interface view is (50, 30). Because the current image filling manner is the filling manner 2, the sizes of the pentagram (that is, the image region for responding to the click event in the interface view) in the view in the vertical and horizontal directions are both 60, and the coordinate position of the click position relative to the pentagram is (10, 30). Through the determination of the relative position, it may be determined whether the click event occurs in the picture region of the view (for example, the rectangular region shown in FIG. 9). However, in an embodiment, the picture region includes an image region (for example, the picture of the pentagram shown in FIG. 9) that can respond to the click event and the region that cannot respond to the click event (for example, the region outside the picture of the pentagram shown in FIG. 9). As shown in FIG. 7, in the foregoing determination manner, when the user clicks the central region of the screen, it may be determined that the click event is located inside the picture region. However, because only the irregular region formed by the sides numbered 701 to 704 can respond to the click event, the current view control (root view) cannot respond to the click event at the center of the screen, and the event may be transferred to a child view, that is, a next layer of view of the current view.

The determining a pixel position corresponding to the relative position is further described.

After the position of the click position relative to the image region for responding to the click event in the interface view is determined, if the click position is at the image region, original pixel information (that is, original size information) of the picture in the interface view (for example, the picture of the pentagram in FIG. 9) is obtained, and a pixel position corresponding to the relative position is determined based on the relative position and the original pixel information of the picture. Description is still made with the example shown in FIG. 9. When it is determined that the coordinate position of the click position relative to the pentagram is (10, 30), if the obtained original pixel information of the picture is 90 pixel×90 pixel, it may be calculated that the pixel position of the relative position on the picture is (10×(90/60), 30×(90/60)), wherein 90 is the original pixel size of the picture and 60 is the displayed pixel size of the picture in the interface view. Thus in this example, the pixel position of the relative position on the picture (or the position corresponding to the coordinate) is (15, 45).

Herein, the original pixel information of the image displayed in the interface view and color information corresponding to each pixel are pre-stored. When a pixel is located, color information corresponding to the pixel may be determined by searching stored picture information. In an embodiment, the color information herein may be red-green-blue-Alpha (RGBA) information and is certainly not limited to the RGBA, for example, an HSV value. RGBA is a color space representing Red, Green, Blue, and Alpha. HSV is a color space created according to an intuitive feature of colors. Parameters of colors in the space are: Hue, Saturation, and Value.

Step 104: Determine, according to the obtained color information of the pixel, a relative position relationship between the click position and the image region for responding to the click event in the interface view.

In an embodiment, the relative position relationship between the click position and the image region for responding to the click event in the interface view may be determined in the following manner:

A similarity between the obtained color information of the pixel and color information of a preset color is calculated, the preset color being different from the color of the image region that can respond to the click event.

When the calculated similarity reaches a similarity threshold, it is determined that the click position is outside the image region. In one implementation, the similarity threshold may be a pre-set similarity threshold. In another implementation, the similarity threshold may be a threshold adjustable during a process in real time. When the calculated similarity reaches the similarity threshold, the calculated similarity may be equal to or larger than the similarity threshold.

When the calculated similarity does not reach the similarity threshold, it is determined that the click position is inside the image region. When the calculated similarity does not reach the similarity threshold, the calculated similarity may be smaller than the similarity threshold.

Herein, the transparently transmitting the click event is first described. If the current view control determines that it is not necessary to respond to the received click event, the click event is transparently transmitted (transferred) to a next layer of view, that is, a child view control continues to perform determination. When the similarity between the color of the pixel corresponding to the click event and a set color reaches the preset similarity threshold, the click event may be transparently transmitted, the set color herein being the preset color. In an embodiment, the preset color may be set as a transparent color, and the setting of the preset color takes the color that is different from that of the image region responding to the click event as a reference. In an embodiment, the preset color may be the color of the region, except for the image region, displayed in the current view. For example, the color of the image region responding to the click event is yellow, and the preset color is white.

In an embodiment, the similarity between the color information of the pixel and the color information of the preset color may be calculated in the following manner:

A hue-saturation-value (HSV) value corresponding to the pixel is obtained; and a similarity between the HSV value corresponding to the pixel and an HSV value corresponding to the preset color is calculated.

Herein, the obtaining the HSV value of the pixel is first described. Because the color information of the image is pre-stored, if the stored color information of the image is the RGBA information of each pixel in the image, an RGB value corresponding to the pixel may be obtained, and the RGB value of the pixel is converted into the corresponding HSV value. If the stored color information of the image is the HSV value of each pixel in the image, the HSV value corresponding to the pixel may be directly obtained through searches.

The calculating the similarity is then described. In an embodiment, a distance in an HSV color space between the HSV value corresponding to the pixel and the HSV value corresponding to the preset color may be calculated; and the similarity may be calculated based on the distance. In one implementation, the similarity may be inversely related with the distance. In another implementation, a larger distance may indicate a smaller similarity; and a smaller distance may indicate a larger similarity.

In another embodiment, the similarity between the color information of the pixel and the color information of the preset color may further be calculated in the following manner:

The RGBA value corresponding to the pixel is obtained; and a similarity between the RGBA value corresponding to the pixel and an RGBA value corresponding to the preset color is calculated. For example, it may be first determined whether a difference between the Alpha value corresponding to the pixel and the Alpha value of the preset color is less than a set threshold. When the difference between the Alpha values is not less than the set threshold, the similarity of RGBA definitely cannot reach the set similarity threshold. When the difference between the Alpha values is less than the set threshold, a difference in RGB is further compared. When the difference in RGB is less than a set threshold, it is considered that the similarity reaches the set similarity threshold, or otherwise it is considered that the similarity does not reach the set similarity threshold. The similarity may be calculated based on the difference in RGB and/or the difference in Alpha value. In one implementation, the similarity may be inversely related with the difference in RGB and/or the difference in Alpha value. In another implementation, a larger difference in RGB and/or a larger difference in Alpha value may indicate a smaller similarity; and a smaller difference in RGB and/or a smaller difference in Alpha value may indicate a larger similarity.

Step 105: Process the click event based on the determined relative position relationship.

Herein, during actual application, when it is determined that the similarity between the pixel color of the click position and the preset color reaches the set similarity threshold, it is determined that the click position is not in the image region for responding to the click event, and the click event is transparently transmitted to the next layer of view, that is, the child view of the current view, and the next layer of view determines, according to a determination logic (for example, according to a position relationship of the click event), whether to respond to the click event, until the view that can respond to the click event is determined. Alternatively, when all the views at the bottom of the picture view are traversed and no view that can respond to the click event is found, the click event is discarded and an error is reported. When it is determined that the similarity between the pixel color of the click position and the preset color does not reach the set similarity threshold and the click position is in the image region for responding to the click event, the view control responds to the click event, for example, corresponding to the scenario in FIG. 7, performs a corresponding page jump.

Figure 10:
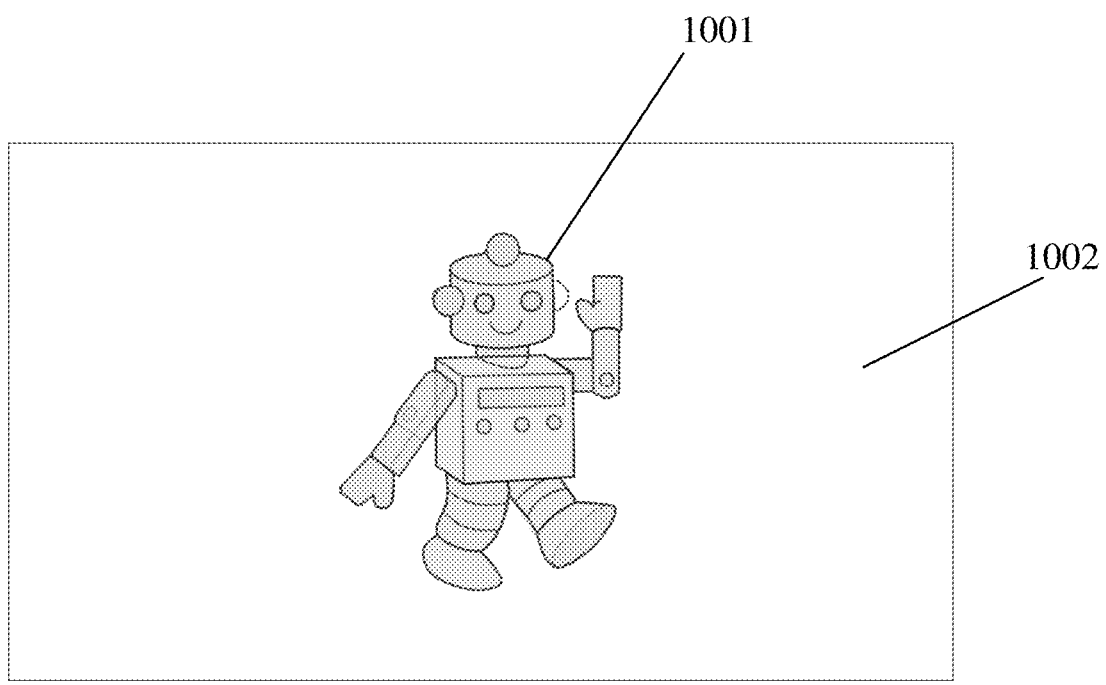
FIG. 10 is a schematic diagram of a scenario of a method for processing information in a view according to an embodiment of this application.

In an embodiment, the method for processing information in a view provided in the embodiments of this application may further be implemented as the following scenario: FIG. 10 is a schematic diagram of a scenario of a method for processing information in a view according to an embodiment of this application. Referring to FIG. 10, a view component of a frame animation player invokes a playing method of a frame animation to update an interface. During the playing of a frame animation, each frame of the animation exists as a view. When the user implements a click operation, a view control receives a click event, and a relative position relationship between a click position and an image region (for example, a region 1001 corresponding to a little robot in FIG. 10) that can respond to the click event in the view is determined by obtaining color information of a pixel of the click position. For example, a preset color (a color corresponding to a region 1002) is transparent, and a similarity between the color information of the pixel of the click position and the color information of the preset color is calculated. When the similarity reaches a similarity threshold, it may be known that the click position is outside the little robot, and the click event is transparently transmitted to a next frame of the animation while the next frame is played. When the similarity does not reach the similarity threshold, it may be known that the click position is inside the little robot, a response is made to the click event, for example, a jump from the current page to another page is performed.

Figure 11:
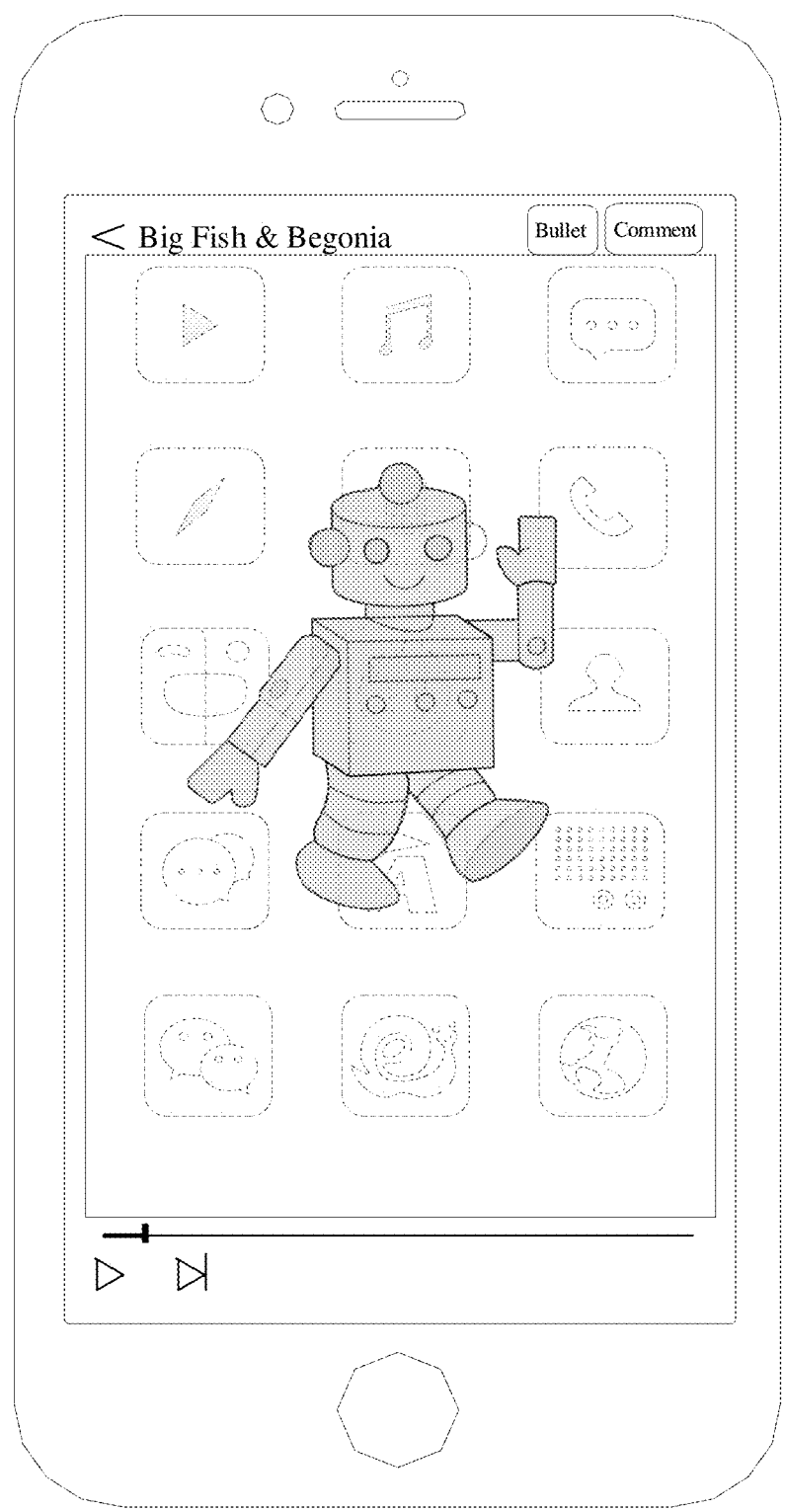
FIG. 11 is a schematic diagram of a scenario of a method for processing information in a view according to an embodiment of this application.

In an embodiment, the method for processing information in a view provided in this embodiment of this application may further be implemented as the following scenario: FIG. 11 is a schematic diagram of a scenario of a method for processing information in a view according to an embodiment of this application. Referring to FIG. 11, a view component of a video player invokes a transparent channel video playing method to update an interface. During playing of a video, the video is above a user interface, and the user may see icons displayed in the user interface under the video through the video. When the user implements a click operation, a view control receives a click event, and a relative position relationship between a click position and an image region (for example, a region corresponding to a little robot in FIG. 11) that can respond to the click event in the view is determined by obtaining color information of a pixel of the click position. For example, a preset color is transparent, and a similarity between the color information of the pixel of the click position and the color information of the preset color is calculated. When the similarity reaches a similarity threshold, it may be known that the click position is outside the little robot and the click event is transparently transmitted to a view corresponding to the icon. When the similarity does not reach the similarity threshold, it may be known that the click position is inside the little robot, a response is made to the click event, for example, content in a current page is scaled up.

Figure 12:
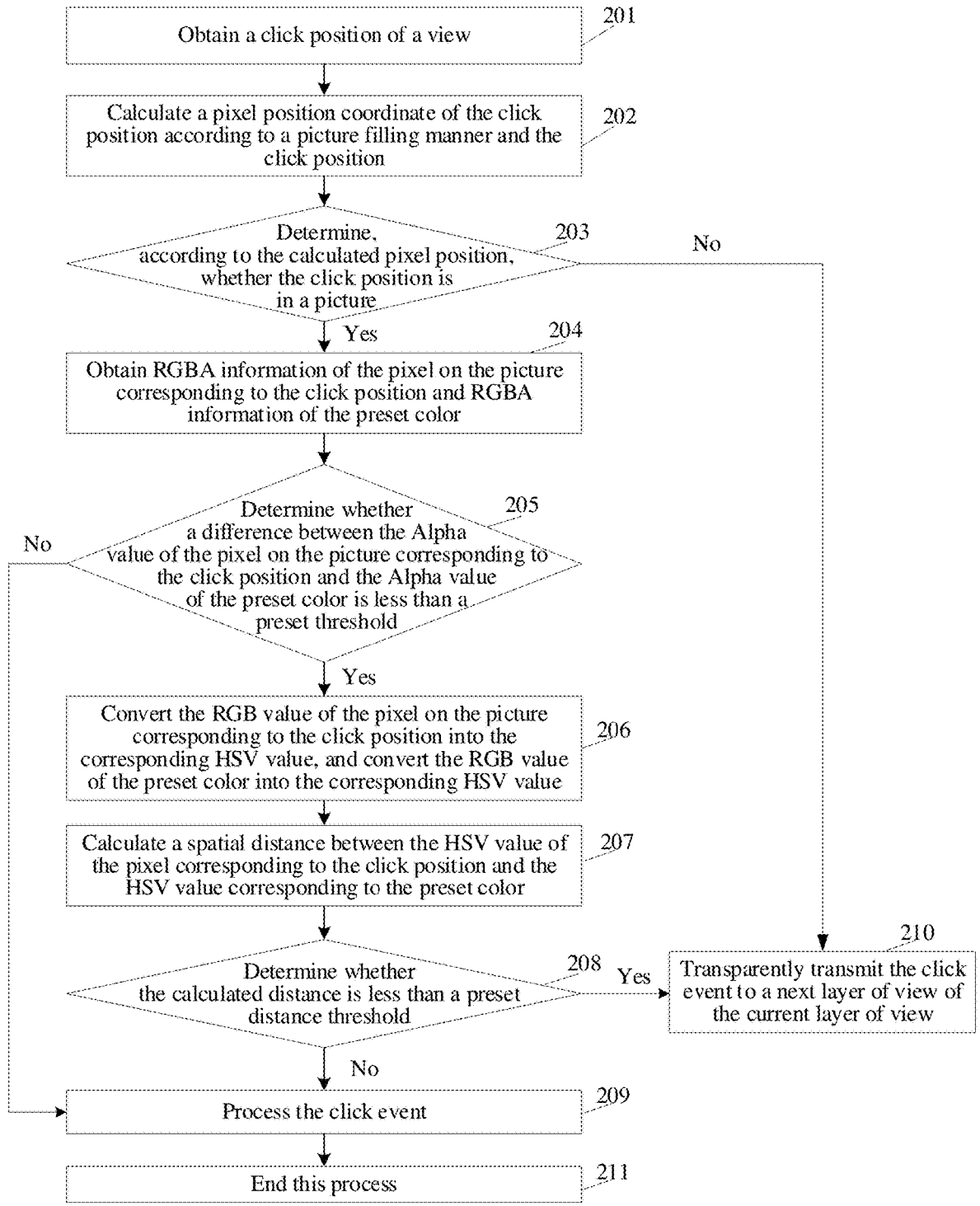
FIG. 12 is a schematic flowchart of a method for processing information in a view according to an embodiment of this application.

FIG. 12 is an exemplary schematic flowchart of a method for processing information in a view according to an embodiment of this application. Referring to FIG. 12, the method for processing information in a view provided in this embodiment of this application includes the following steps:

Step 201: Obtain a click position of a view.

During actual application, the view herein may be understood as an image view that can display a picture, and a display region of the picture is used for responding to the click event of the display region. When the user implements a click operation, a view component receives the click event and locates the position of the click event (that is, a click position). The click position herein is a position of the click event relative to the image view with reference to the view interface.

Step 202: Calculate a pixel position coordinate of the click position according to a picture filling manner and the click position.

The pixel position coordinate herein is a pixel coordinate corresponding to a position of the click position relative to the picture in the view. During actual implementation, to obtain the color information of the pixel of the click position, it is necessary to convert the position coordinate of the click position relative to the view into the position coordinate of the click position relative to the picture displayed in the view. For the specific coordinate conversion process, reference may be made to the foregoing embodiment, which is not described herein.

Step 203: Determine, according to the calculated pixel position, whether the click position is in a picture, and if the click position is in the picture, perform step 204, or otherwise perform step 210.

Step 204: Obtain RGBA information of the pixel on the picture corresponding to the click position and RGBA information of the preset color.

Figure 13:
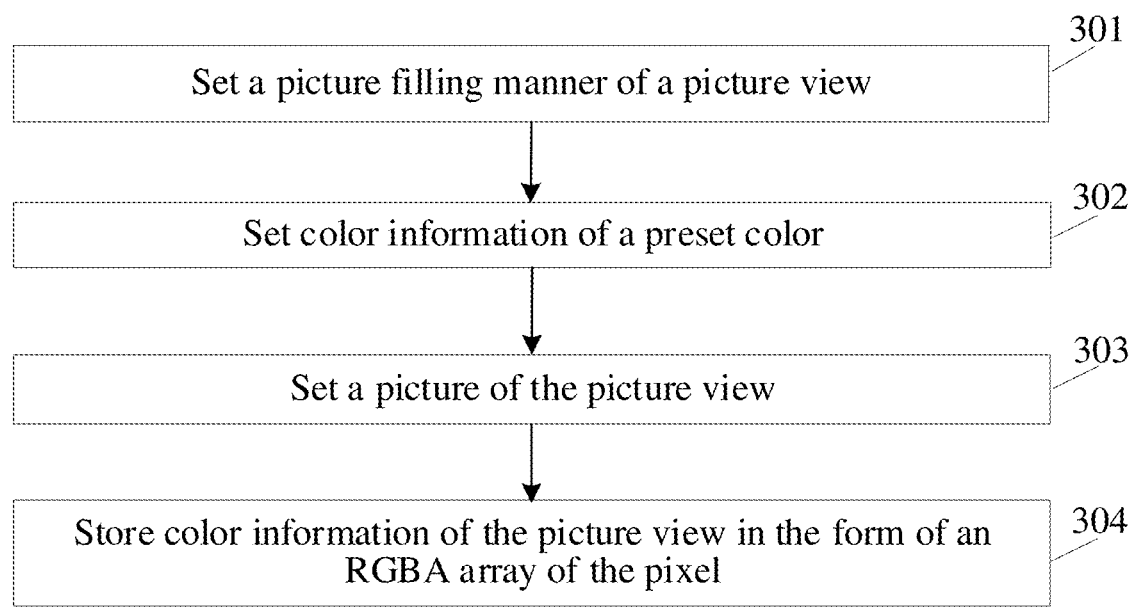
FIG. 13 is a schematic flowchart of picture view initialization according to an embodiment of this application.

Herein, during actual application, the color information of the picture, for example, the RGBA information corresponding to each pixel in the picture, is pre-stored. Before the view is displayed, it is necessary to initialize the view, and the picture filling manner of the view (the stretching and layout of the picture in the view, for example, the picture is placed at the center, and the picture is scaled up by 1.5 times) and the preset color are preset. For example, the preset color is transparent. In an embodiment, a process of picture view initialization is shown in FIG. 13. FIG. 13 is a schematic flowchart of picture view initialization according to an embodiment of this application. Referring to FIG. 13, the picture view initialization includes the following steps:

Step 301: Set a picture filling manner of a picture view.

Step 302: Set color information of a preset color.

The preset color herein is transparent by default, and the corresponding color information may be RGBA information of the preset color.

Step 303: Set a picture of the picture view.

Step 304: Store color information of the picture view in the form of an RGBA array of the pixel.

Step 205: Determine whether a difference between the Alpha value of the pixel on the picture corresponding to the click position and the Alpha value of the preset color is less than a preset threshold, and if the difference is less than the preset threshold, perform step 206, or otherwise perform step 210.

Step 206: Convert the RGB value of the pixel on the picture corresponding to the click position into the corresponding HSV value, and convert the RGB value of the preset color into the corresponding HSV value.

During actual application, although RGB expresses colors directly, there is no direct connection between the R, G, B values and three attributes of colors, which cannot reveal the relationship between colors. Especially in the case of lossy compression of picture, RGB values are prone to deviations. Therefore, it is more accurate to convert RGB into HSV to compare the similarity.

Step 207: Calculate a spatial distance between the HSV value of the pixel corresponding to the click position and the HSV value corresponding to the preset color.

Herein, the calculating the distance on the HSV space may be a Euclidean distance between the two.

Step 208: Determine whether the calculated distance is less than a preset distance threshold, and if the distance is not less than the preset distance threshold, perform step 209, or if the distance is less than the preset distance threshold, perform step 210.

Step 209: Process the click event, and perform step 211.

Herein, when it is determined that the spatial distance between the HSV value of the pixel corresponding to the click position and the HSV value corresponding to the preset color is not less than the preset distance threshold, the click position does not fall into the region corresponding to the preset color, that is, the click position is in the picture region for responding to the click event, and the view component responds to the click event, for example, to perform a page jump.

Step 210: Transparently transmit the click event to a next layer of view of the current layer of view.

Herein, when it is determined that the spatial distance between the HSV value of the pixel corresponding to the click position and the HSV value corresponding to the preset color is less than the preset distance threshold, it indicates that the click position falls into the region corresponding to the preset color, that is, the click position is not in the picture region for responding to the click event, and the view component transparently transmits the click event to the next layer of view of the current layer of view for processing. Corresponding to FIG. 7, when the position clicked by the user is a portrait region, because the click event does not fall into sides (numbered 701-704) that can respond to the click event, the click event is transparently transmitted to the next layer of view. Corresponding to FIG. 7, in an embodiment, the next layer of view is a picture view for displaying a picture in which a portrait is located, the view responds to the click event, and the picture in which the portrait is located is scaled up and displayed.

With the application of the foregoing embodiments of this application, the click event in the irregular image region can be accurately processed, so that implementation is simple and the applicability is high.

Step 211: End this processing procedure.

Figure 14:
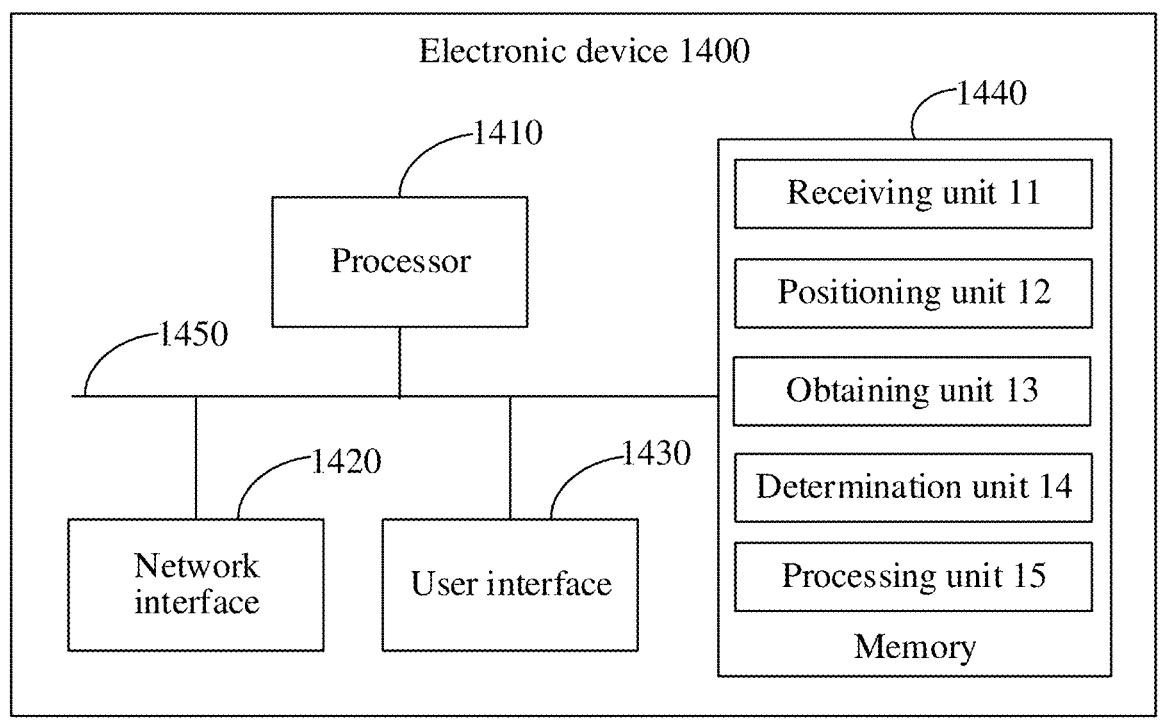
FIG. 14 is a schematic structural diagram of an apparatus for processing information in a view according to an embodiment of this application.

An apparatus for processing information in a view provided in the embodiments of this application is further described. For example, the apparatus for processing information in a view provided in the embodiments of this application is implemented by using a combination of hardware and software. The apparatus for processing information in a view provided in the embodiments of this application may be directly a software module in different forms executed by a processor 1410 of an electronic device 1400. The software module may be in a storage medium, and the storage medium is in a memory 1440. The processor 1410 reads executable instructions included in the software module in the memory 1440, and the method for processing information in a view provided in the embodiments of this application is completed in combination with necessary hardware (for example, including the processor 1410 and other components such as a network interface 1420 and a user interface 1430 that are connected to a bus 1450). Referring to FIG. 14, the apparatus includes:

a receiving unit 11, configured to receive a click event for an interface view, the interface view including an image region for responding to the click event;

a positioning unit 12, configured to determine a click position of the click event in the interface view;

an obtaining unit 13, configured to obtain color information of a pixel corresponding to the click position based on the click position;

a determination unit 14, configured to determine a relative position relationship between the click position and the image region according to the obtained color information of the pixel; and a processing unit 15, configured to process the click event based on the determined relative position relationship.

In an embodiment, the determination unit 14 is further configured to calculate a similarity between the color information of the pixel and color information of a preset color, the preset color being different from the color of the image region;

determine that the click position is outside the image region when the calculated similarity reaches a similarity threshold; and determine that the click position is inside the image region when the calculated similarity does not reach a similarity threshold.

In an embodiment, the determination unit 14 is further configured to: obtain a hue-saturation-value (HSV) value corresponding to the pixel; and calculate a similarity between the HSV value corresponding to the pixel and an HSV value corresponding to the preset color.

In an embodiment, the determination unit 14 is further configured to: obtain a red-green-blue (RGB) value corresponding to the pixel; and convert the obtained RGB value into a corresponding HSV value.

In an embodiment, the determination unit 14 is further configured to calculate a distance in an HSV color space between the HSV value corresponding to the pixel and the HSV value corresponding to the preset color, the distance being used for representing the similarity.

In an embodiment, the determination unit 14 is further configured to: obtain an RGBA value corresponding to the pixel; and calculate a similarity between the RGBA value corresponding to the pixel and an RGBA value corresponding to the preset color.

In an embodiment, the processing unit 15 is further configured to: transparently transmit the click event to a child view of the interface view when the click position is outside the image region; and respond to the click event when the click position is inside the image region.

In an embodiment, the obtaining unit 13 is further configured to: determine a position of the click position relative to the image region based on the click position;

determine a pixel position corresponding to the position according to the position relative to the image region; and obtain the color information of the pixel corresponding to the pixel position.

In an embodiment, the obtaining unit 13 is further configured to: obtain an image filling manner of the interface view; and determine a position of the click position relative to the image region based on the image filling manner and the click position.

An embodiment of this application further provides a storage medium storing an executable program, and the executable program implements the foregoing method for processing information in a view in the embodiments of this application when executed by the processor.

The foregoing description related to the apparatus for processing information in a view is similar to the description of the foregoing method for processing information in a view. For the description of beneficial effects of the same methods, details are not described again. For technical details not disclosed in this embodiment of the apparatus for processing information in a view in this application, refer to the descriptions of the method embodiment in this application.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for determining a relative position relationship of a click event, the method comprising:
   receiving, by a device comprising a memory storing instructions and a processor in communication with the memory configured to execute the stored instructions, a click event in an interface view, the interface view comprising an image region configured to respond to the click event;
   determining, by the device, a click position of the click event in the interface view;
   obtaining, by the device, color information of a pixel corresponding to the click position based on the click position of the click event in the interface view;
   determining, by the device according to the color information of the pixel corresponding to the click position, a relative position relationship between the click position and the image region by:
      setting a preset color as a color of a region other than the image region and being different from that of the image region,
      calculating a similarity between the color information of the pixel and color information of the preset color, a larger similarity indicating a smaller difference between the color information of the pixel and the color information of the preset color,
      in response to the calculated similarity being equal to or larger than a similarity threshold, determining that the click position is outside the image region, and
      in response to the calculated similarity being smaller than the similarity threshold, determining that the click position is inside the image region; and
   processing, by the device, the click event based on the relative position relationship.

2. The method according to claim 1, wherein the calculating the similarity between the color information of the pixel and the color information of the preset color comprises:

obtaining a hue-saturation-value (HSV) value corresponding to the pixel; and calculating a similarity between the HSV value corresponding to the pixel and an HSV value corresponding to the preset color.

3. The method according to claim 2, wherein the obtaining a hue-saturation-value (HSV) value corresponding to the pixel comprises:

obtaining a red-green-blue (RGB) value corresponding to the pixel; and converting the obtained RGB value into the HSV value.

4. The method according to claim 2, wherein the calculating the similarity between the HSV value corresponding to the pixel and an HSV value corresponding to the preset color comprises:

calculating a distance in an HSV color space between the HSV value corresponding to the pixel and the HSV value corresponding to the preset color; and calculating the similarity between the HSV value corresponding to the pixel and an HSV value corresponding to the preset color based on the distance.

5. The method according to claim 1, wherein the calculating the similarity between the color information of the pixel and color information of the preset color comprises:

obtaining a red-green-blue-Alpha (RGBA) value corresponding to the pixel; and calculating a similarity between the RGBA value corresponding to the pixel and an RGBA value corresponding to the preset color.

6. The method according to claim 1, wherein the processing the click event based on the relative position relationship comprises:

in response to the click position being outside the image region, transmitting the click event to a child view of the interface view; and in response to the click position being inside the image region, responding to the click event.

7. An apparatus for determining a relative position relationship of a click event, the apparatus comprising:

a memory storing instructions; and a processor in communication with the memory, wherein, when the processor executes the instructions, the processor is configured to cause the apparatus to:

receive a click event in an interface view, the interface view comprising an image region configured to respond to the click event, determine a click position of the click event in the interface view, obtain color information of a pixel corresponding to the click position based on the click position of the click event in the interface view, determine, according to the color information of the pixel corresponding to the click position, a relative position relationship between the click position and the image region by:

setting a preset color as a color of a region other than the image region and being different from that of the image region, calculating a similarity between the color information of the pixel and color information of the preset color, a larger similarity indicating a smaller difference between the color information of the pixel and the color information of the preset color, in response to the calculated similarity being equal to or larger than a similarity threshold, determining that the click position is outside the image region, and in response to the calculated similarity being smaller than the similarity threshold, determining that the click position is inside the image region, and process the click event based on the relative position relationship.

8. The apparatus according to claim 7, wherein, when the processor is configured to cause the apparatus to calculate the similarity between the color information of the pixel and the color information of the preset color, the processor is configured to cause the apparatus to:

obtain a hue-saturation-value (HSV) value corresponding to the pixel; and calculate a similarity between the HSV value corresponding to the pixel and an HSV value corresponding to the preset color.

9. The apparatus according to claim 8, wherein, when the processor is configured to cause the apparatus to obtain a hue-saturation-value (HSV) value corresponding to the pixel, the processor is configured to cause the apparatus to:

obtain a red-green-blue (RGB) value corresponding to the pixel; and convert the obtained RGB value into the HSV value.

10. The apparatus according to claim 8, wherein, when the processor is configured to cause the apparatus to calculate the similarity between the HSV value corresponding to the pixel and an HSV value corresponding to the preset color, the processor is configured to cause the apparatus to:

calculate a distance in an HSV color space between the HSV value corresponding to the pixel and the HSV value corresponding to the preset color; and calculate the similarity between the HSV value corresponding to the pixel and an HSV value corresponding to the preset color based on the distance.

11. The apparatus according to claim 7, wherein, when the processor is configured to cause the apparatus to calculate the similarity between the color information of the pixel and color information of the preset color, the processor is configured to cause the apparatus to:

obtain a red-green-blue-Alpha (RGBA) value corresponding to the pixel; and calculate a similarity between the RGBA value corresponding to the pixel and an RGBA value corresponding to the preset color.

12. The apparatus according to claim 7, wherein, when the processor is configured to cause the apparatus to process the click event based on the relative position relationship, the processor is configured to cause the apparatus to:

in response to the click position being outside the image region, transmit the click event to a child view of the interface view; and in response to the click position being inside the image region, respond to the click event.

13. A non-transitory computer readable storage medium, storing computer readable instructions, wherein, the computer readable instructions, when executed by a processor, are configured to cause the processor to perform:

receiving a click event in an interface view, the interface view comprising an image region configured to respond to the click event;

determining a click position of the click event in the interface view;

obtaining color information of a pixel corresponding to the click position based on the click position of the click event in the interface view;

determining, according to the color information of the pixel corresponding to the click position, a relative position relationship between the click position and the image region by:

setting a preset color as a color of a region other than the image region and being different from that of the image region, calculating a similarity between the color information of the pixel and color information of the preset color, a larger similarity indicating a smaller difference between the color information of the pixel and the color information of the preset color, in response to the calculated similarity being equal to or larger than a similarity threshold, determining that the click position is outside the image region, and in response to the calculated similarity being smaller than the similarity threshold, determining that the click position is inside the image region; and processing the click event based on the relative position relationship.

14. The non-transitory computer readable storage medium according to claim 13, wherein, when the computer readable instructions are configured to cause the processor to perform calculating the similarity between the color information of the pixel and the color information of the preset color, the computer readable instructions are configured to cause the processor to perform:

obtaining a hue-saturation-value (HSV) value corresponding to the pixel; and calculating a similarity between the HSV value corresponding to the pixel and an HSV value corresponding to the preset color.

15. The non-transitory computer readable storage medium according to claim 14, wherein, when the computer readable instructions are configured to cause the processor to perform obtaining a hue-saturation-value (HSV) value corresponding to the pixel, the computer readable instructions are configured to cause the processor to perform:

obtaining a red-green-blue (RGB) value corresponding to the pixel; and converting the obtained RGB value into the HSV value.

16. The non-transitory computer readable storage medium according to claim 14, wherein, when the computer readable instructions are configured to cause the processor to perform calculating the similarity between the HSV value corresponding to the pixel and an HSV value corresponding to the preset color, the computer readable instructions are configured to cause the processor to perform:

calculating a distance in an HSV color space between the HSV value corresponding to the pixel and the HSV value corresponding to the preset color; and calculating the similarity between the HSV value corresponding to the pixel and an HSV value corresponding to the preset color based on the distance.

17. The non-transitory computer readable storage medium according to claim 13, wherein, when the computer readable instructions are configured to cause the processor to perform calculating the similarity between the color information of the pixel and color information of the preset color, the computer readable instructions are configured to cause the processor to perform:

obtaining a red-green-blue-Alpha (RGBA) value corresponding to the pixel; and calculating a similarity between the RGBA value corresponding to the pixel and an RGBA value corresponding to the preset color.

* * * * *